US012654745B2

(12) United States Patent
Agrawal et al.

(10) Patent No.: US 12,654,745 B2
(45) Date of Patent: Jun. 16, 2026

(54) RECOVERY FROM STOPPING TRAJECTORY WHILE IN MOTION

(71) Applicant: Zoox, Inc., Foster City, CA (US)

(72) Inventors: Varun Agrawal, Mountain View, CA (US); Brian Michael Filarsky, San Francisco, CA (US); Joseph Funke, Redwood City, CA (US); Vincent Andreas Laurense, Foster City, CA (US); Glenn Xavier Liem, San Francisco, CA (US); Jiayin Xia, Santa Clara, CA (US)

(73) Assignee: Zoox, Inc., Foster City, CA (US)

( * ) Notice: Subject to any disclaimer, the term of this patent is extended or adjusted under 35 U.S.C. 154(b) by 228 days.

(21) Appl. No.: 18/362,712

(22) Filed: Jul. 31, 2023

(65) Prior Publication Data

US 2025/0042436 A1     Feb. 6, 2025

(51) Int. Cl.
| | |
|---|---|
| *B60W 30/09* | (2012.01) |
| *B60W 30/095* | (2012.01) |
| *B60W 30/18* | (2012.01) |
| *B60W 40/105* | (2012.01) |
| *B60W 50/00* | (2006.01) |
| *B60W 50/02* | (2012.01) |
| *B60W 60/00* | (2020.01) |

(52) U.S. Cl.
CPC ........ *B60W 60/0015* (2020.02); *B60W 30/09* (2013.01); *B60W 30/0956* (2013.01); *B60W 30/18018* (2013.01); *B60W 40/105* (2013.01); *B60W 50/0097* (2013.01); *B60W 50/02* (2013.01); *B60W 60/0011* (2020.02)

(58) Field of Classification Search
CPC ............ B60W 60/0015; B60W 30/09; B60W 30/0956; B60W 30/18018; B60W 40/105; B60W 50/0097; B60W 50/0205; B60W 60/0011; B60W 50/02
See application file for complete search history.

(56) References Cited

U.S. PATENT DOCUMENTS

| | | | |
|---|---|---|---|
| 11,673,565 B1 | 6/2023 | Dingli et al. | |
| 2010/0256852 A1* | 10/2010 | Mudalige ................. | G08G 1/22 701/24 |

(Continued)

FOREIGN PATENT DOCUMENTS

| | | | |
|---|---|---|---|
| DE | 102016213842 A1 * | 2/2018 | ........ B60W 50/0097 |
| EP | 3279851 A1 | 2/2018 | |
| JP | 2022166112 A | 11/2022 | |

OTHER PUBLICATIONS

International Search Report and Written Opinion dated Oct. 28, 2024 for International PCT Application No. PCT/US2024/037665.

*Primary Examiner* — Daniel M. Robert
(74) *Attorney, Agent, or Firm* — EIP US LLP

(57) ABSTRACT

Techniques are described herein for safely transitioning a vehicle from a first trajectory to a second trajectory. In response to a safety event, for example, a vehicle may switch from being controlled in accordance with a nominal planner output (a planned trajectory) to a safety, or stopping, trajectory. In some examples, in response to the vehicle overcoming the safety event, a safe and smooth return to a nominal planning system output trajectory (an updated planned trajectory) may be determined and used to cause the vehicle to continue along to a previously determined destination.

14 Claims, 9 Drawing Sheets

(56)                  References Cited

U.S. PATENT DOCUMENTS

| | | | |
|---|---|---|---|
| 2019/0146519 A1* | 5/2019 | Miura | B60W 30/09 |
| | | | 701/28 |
| 2020/0148201 A1* | 5/2020 | King | B60W 30/0956 |
| 2020/0363818 A1* | 11/2020 | Li | G05D 1/65 |
| 2021/0009128 A1* | 1/2021 | Jokela | B60W 20/12 |
| 2021/0139050 A1 | 5/2021 | Fujita et al. | |
| 2022/0111871 A1* | 4/2022 | Schmitt | B60Q 1/507 |
| 2022/0250646 A1* | 8/2022 | Kobilarov | B60W 60/0011 |
| 2023/0041975 A1* | 2/2023 | Caldwell | B60W 60/0027 |
| 2023/0132512 A1 | 5/2023 | Clawson | |
| 2025/0042436 A1* | 2/2025 | Agrawal | B60W 30/0956 |

\* cited by examiner

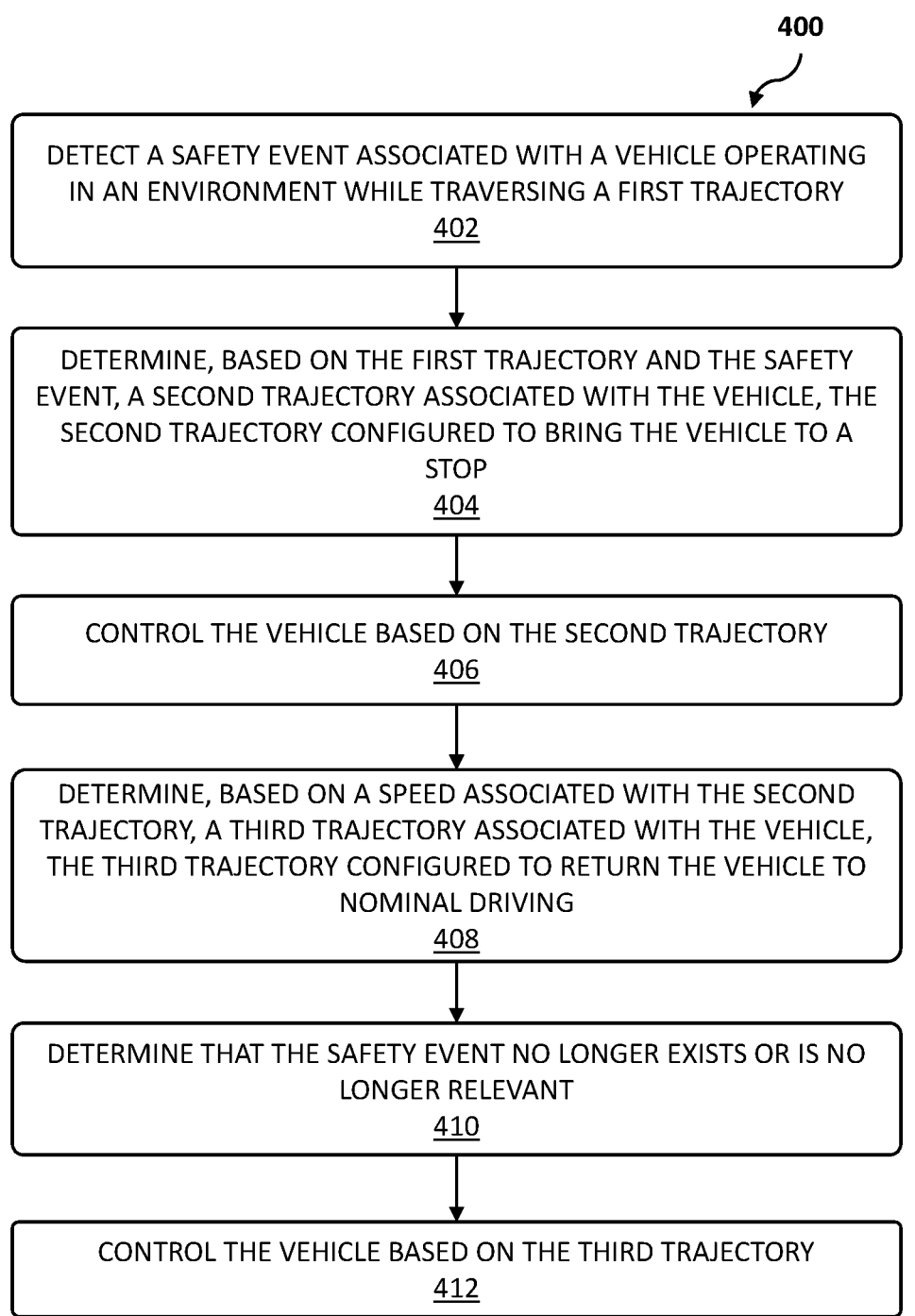

400

DETECT A SAFETY EVENT ASSOCIATED WITH A VEHICLE OPERATING IN AN ENVIRONMENT WHILE TRAVERSING A FIRST TRAJECTORY
402

DETERMINE, BASED ON THE FIRST TRAJECTORY AND THE SAFETY EVENT, A SECOND TRAJECTORY ASSOCIATED WITH THE VEHICLE, THE SECOND TRAJECTORY CONFIGURED TO BRING THE VEHICLE TO A STOP
404

CONTROL THE VEHICLE BASED ON THE SECOND TRAJECTORY
406

DETERMINE, BASED ON A SPEED ASSOCIATED WITH THE SECOND TRAJECTORY, A THIRD TRAJECTORY ASSOCIATED WITH THE VEHICLE, THE THIRD TRAJECTORY CONFIGURED TO RETURN THE VEHICLE TO NOMINAL DRIVING
408

DETERMINE THAT THE SAFETY EVENT NO LONGER EXISTS OR IS NO LONGER RELEVANT
410

CONTROL THE VEHICLE BASED ON THE THIRD TRAJECTORY
412

FIG. 4

RECOVERY FROM STOPPING TRAJECTORY WHILE IN MOTION

BACKGROUND

Safety systems for vehicles may cause such vehicles to come to a stop to avoid unsafe situations, such as an expected collision, detected faults, and the like. However, such maneuvers may require the vehicle to come to a full stop prior to reengaging. By coming to a full stop, the vehicle may create alternate risks (e.g., if performed on a highway) and/or reduce rider comfort where the issue is resolved prior to coming to a stop.

BRIEF DESCRIPTION OF DRAWINGS

The detailed description is described with reference to the accompanying figures. The use of the same reference numbers in different figures indicates similar or identical components or features.

FIG. 4 depicts an example process for determining and implementing a recovery trajectory associated with vehicle operation in an environment, in accordance with examples of this disclosure.

DETAILED DESCRIPTION

Figure 1:
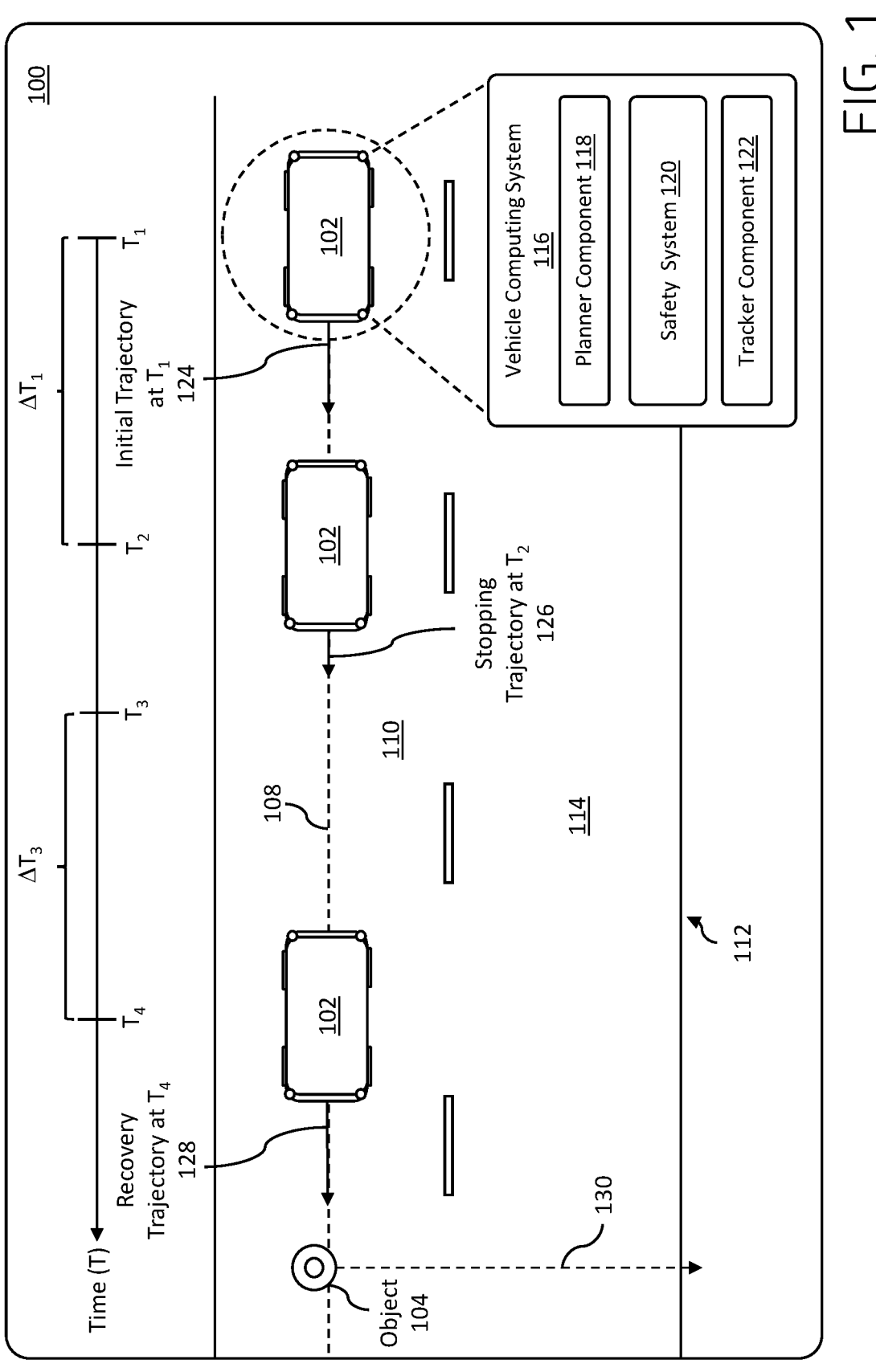
FIG. 1 is an illustration of a vehicle operating in an environment and implementing a vehicle control system, in accordance with examples of this disclosure.

A vehicle control system may determine a trajectory for a vehicle to follow based on an estimated future state of the vehicle, and positional and velocity-based trajectories associated with the estimated future state. Trajectories determined by different components of the control system may sometimes need to be combined and implemented. As an example, a first component may be configured for determining trajectories based on a planned path of a vehicle through an environment and towards a desired destination. A second component may be configured for evaluating the state of the system (e.g., if faults are present) and/or the determining whether the trajectory is safe (e.g., free from collision). As a result of which, the second component may comprise additional actions such as determining trajectories that bring the vehicle to a stop in accordance with a detected adverse safety outcome. In some examples, a vehicle may need to be brought to a complete stop according to a trajectory determined by the second component before moving off according to a trajectory determined by the first component, even if the adverse safety outcome is removed before the vehicle comes to a stop. This can result in an unsatisfactory driving experience and may affect the safety of other road users. This application relates to techniques for improving the vehicle control systems to provide and maintain continuous trajectories that can be combined in a smooth and controlled manner.

In some examples, a vehicle may be configured to traverse a planned path in an environment. Such a path may be a geometric set of positions for the vehicle to follow while traversing from an origin to destination, or any portion thereof. The vehicle may include a control system configured to control the vehicle through the environment based in part on the planned path. In some examples, the control system may include a planner component. In various examples, the planner component may be configured to determine a planned trajectory for the vehicle to follow. In some examples, the planned trajectory may account for one or more deviations from a pre-determined route associated with a vehicle trip, such as deviations taken in response to an object (e.g., another vehicle, a pedestrian, a bicyclist, etc.). In various examples, the planner component may be configured to determine and/or alter trajectories for the vehicle to follow when traveling according to the planned path. In various examples, the planner component may be configured to determine trajectories for the vehicle to follow at a pre-determined interval, such as every 0.1 seconds, 0.05 seconds, or the like. As used herein, the term planned trajectory may be used to describe a previously determined trajectory (e.g., a trajectory determined at a previous time interval). For example, the planner component may determine, at pre-determined time intervals, a new trajectory for the vehicle to follow based at least in part on a previous trajectory, newly received sensor data, and the like. The planner component may, at each time interval, pass the new trajectory to a second component of the control system, such as a safety system that will be discussed in further detail below.

In various examples, a tracker component may be configured to determine one or more control signals to send to a drive system to control the vehicle according to the new trajectory. In various examples, the control signal(s) may include instructions to modify settings associated with one or more components of a drive system of the vehicle (e.g., motor, engine, transmission, steering components, braking components, etc.). As a non-limiting example, the tracker component may inform a particular current to supply to one or more motor controllers to cause a certain torque to be applied to one or more wheels (and, in turn, a desired acceleration or velocity of the vehicle). In such examples, the tracker component may be configured to cause the vehicle to be controlled according to the new trajectory including, without limitation, to move from a current state (location, orientation, speed, etc.) to a state defined by the trajectory. As discussed herein, the vehicle control system may be associated with a vehicle computing system.

In some scenarios, an adverse safety outcome may be predicted, or determined, to occur. The predicted or determined adverse safety outcome, also referred to herein as a safety event, may mean that trajectories determined by the planner component are inadequate for safe operation of the vehicle. For example, the planner component may be unable to determine a new trajectory that can safely traverse, address, and/or avoid the safety event.

Generally, a safety event may be any event that may have an impact on the safety of the vehicle, one or more other vehicles, or one or more objects or people in the environment of the vehicle. In some examples, the safety event may include one or more objects in a path of the vehicle operating according to a current trajectory. The safety event may include a fault associated with the vehicle, a fault associated with another vehicle or a fault associated with a control system associated with transport safety such as a broken set of traffic lights at a junction, for example. For this reason, the control system of the vehicle may include a safety system that is configured to determine trajectories that are designed to traverse, address and/or avoid such safety events. For example, an object may diverge significantly from a predicted behavior used to generate the trajectory, an object may not have been detected when generating the trajectory, or the like. As a particular example, the safety system may determine that the vehicle meets or exceeds a threshold probability of colliding with the object if the vehicle were to continue moving according to the current trajectory. The vehicle computing system may determine object relevance and predicted object trajectories utilizing techniques such as those described in U.S. patent application Ser. No. 16/389,720, filed Apr. 19, 2019 and entitled "Dynamic Object Relevance Determination," U.S. patent application Ser. No. 16/417,260, filed May 20, 2019 and entitled "Object Relevance Determination," U.S. patent application Ser. No. 15/807,521, filed Nov. 8, 2017, and entitled "Probabilistic Heat Maps for Behavior Prediction," U.S. patent application Ser. No. 16/151,607, filed Oct. 4, 2018 and entitled "Trajectory Prediction on Top-Down Scenes," U.S. patent application Ser. No. 16/504,147 filed Jul. 5, 2019 and entitled "Prediction on Top-Down Scenes based on Action Data," the entire contents of each of which are incorporated herein by reference for all purposes.

The safety system may therefore determine a trajectory that is designed to avoid a collision with the object. The trajectory may be a stopping trajectory whereby the vehicle would be brought to a stop before it reaches the object. Such a stopping trajectory may be an emergency stop or some other braking maneuver, for example.

The present application describes techniques for safely resuming nominal operations without fully executing the stopping trajectory. The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

FIG. 1 is a schematic diagram illustrating a vehicle 102 implementing a control system operating in an example environment 100 in which a vehicle 102 implementing a control system operates. In the illustrated example, the vehicle 102 is traversing the environment 100, although in other examples the vehicle 102 may be stationary (e.g., stopped at a stop sign, red light, etc.) and/or parked in the environment 100. In some examples, such as the illustrative example of FIG. 1, one or more objects 104 may additionally be present in the environment 100. For instance, FIG. 1 illustrates an object 104 (e.g., a traffic cone). Although not illustrated, any number and/or type of objects, including static objects, e.g., road signs, parked vehicles, fire hydrants, buildings, curbs, or the like, and/or dynamic objects, e.g., pedestrians, animals, cyclists, trucks, motorcycles, other vehicles, or the like, can additionally or alternatively be present in the environment 100.

In various examples, a vehicle computing system 116 of the vehicle 102 may be configured to determine the objects 104 in the environment 100 based on sensor data received from one or more sensors. The sensors may include cameras, motion detectors, lidar, radar, inertial sensors, and the like. The sensors may be mounted on the vehicle 102 and/or may be remote from the vehicle 102, such as those mounted on other vehicles and/or mounted in the environment 100. In examples in which the sensors are remote sensors (e.g., on other vehicles, mounted in the environment 100), the vehicle computing system 116 may be configured to receive the sensor data via one or more networks. Additional details associated with the sensors are described below with regard to FIG. 3A. In some examples, the vehicle computing system 116 may be configured to determine position, orientation, and/or location information associated with the vehicle 102 based on the sensor data. The vehicle computing system 116 may include a perception component and/or a prediction component that implement techniques discussed in U.S. patent application Ser. No. 15/897,028 entitled "Detecting Blocking Objects" and filed Feb. 14, 2018, and U.S. patent application Ser. No. 15/947,486 entitled "Feature-Based Prediction" and filed Apr. 6, 2018, the entire contents of all of which are incorporated herein by reference.

In some examples, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 may be configured to control all functions from start to stop, including all parking functions, it can be unoccupied. In some examples, the vehicle 102 may include a semi-autonomous vehicle configured to perform at least a portion of the control functions associated with vehicular operation. Additional details associated with the vehicle 102 are described below.

FIG. 1 illustrates a scenario in which the vehicle 102 is traveling through the environment 100 according to a planned path 108. The planned path 108 may include a general planned route of travel for the vehicle 102 to travel from an initial location associated with a trip to a destination. In the illustrative example, the vehicle 102 is operating in a first lane 110 of a road 112, the road including the first lane 110 associated with traffic traveling in a first direction and a second lane 114 associated with traffic traveling in a second (opposite) direction. Though this is merely an illustrative example and the vehicle may be configured to operate in intersections, in multi-lane roads, highways, and the like.

The vehicle 102 may include a vehicle computing system 116 configured to perform some or all of the functions described herein. The vehicle computing system 116 may include a planner component 118 configured to determine the planned path 108 and vehicle trajectories associated with the vehicle 102 operating according to the planned path 108. In the present scenario, the planner component 118 determines an initial trajectory for vehicle 102 operating at a first time $T_1$. In some examples, the vehicle computing system 116 may determine the vehicle trajectory associated with the estimated location of the vehicle utilizing techniques such as those described in U.S. patent application Ser. No. 16/805,118, filed Feb. 28, 2020 and entitled "System and Method for Adjusting a Planned Trajectory of an Autonomous Vehicle," the entire contents of which are incorporated herein by reference for all purposes.

The vehicle computing system 116 may further include a safety system 120 configured to determine trajectories that are generated, or designed, in accordance with one or more safety events. In the present scenario, the object 104 may only be detectable by the one or more sensors when the vehicle is in close proximity to the object 104. Furthermore, the object 104 may be unexpected, in that it does not appear in map data that is used to generate the planned path 108. The safety system 120 may therefore determine a stopping trajectory 126 designed to bring the vehicle 102 to a stop before it reaches the object 104. The stopping trajectory 126 may comprise an emergency stop and/or some other braking maneuver. It is understood that the determination of a stopping trajectory 126 is just one means by which the vehicle 102 can be controlled to avoid the object 104. In some examples, the planner component 118 may be configured to determine trajectories that avoid one or more objects without needing to stop the vehicle 102. The safety system 120 may utilize techniques such as those described in U.S. patent application Ser. No. 16/232,863, filed Dec. 26, 2018 and entitled "Collision Avoidance System," the entire contents of which are incorporated herein by reference for all purposes.

In various examples, the planner component 118 and/or the safety system 120 may be configured to determine vehicle trajectories at a pre-determined rate (e.g., every 0.1 second, every 0.15 seconds, etc.). In such examples, the vehicle trajectories may be determined at a fixed time interval ($\Delta T$). In some examples, the time interval may be determined based on a time associated with the planner component 118 and/or the safety system 120 calculating a next vehicle trajectory. For example, the planner component 118, traveling at an initial vehicle trajectory 124 at a first time $T_1$, may, in general, initiate calculation of a later vehicle trajectory to implement at a later time, $T_L$. The time interval $\Delta T_L$, between the first time and the later time $T_L$ may be a fixed time interval determined to provide the planner component sufficient time to determine the later vehicle trajectory and enable implementation thereof at the later time $T_L$. (e.g., calculation time plus a buffer).

In some examples, the time interval may be determined based on a delay time associated with initiating a modification to a drive system component associated with a next vehicle trajectory. In such examples, the delay time may include a pre-determined time associated with drive system component delays. The drive system components may include a motor, engine, transmission, steering system components, braking system components, and the like. Such delays or latencies may be aggregated or otherwise combined to determine a total latency between trajectory determination and final actuation of the command. In such examples, the overall delay or latency determined may vary from time to time based on which components (or combinations of components) are actuated. In some examples, the drive system component delays may include time associated with a tracker component 122 generating a control signal, the drive system component receiving the control signal, and/or the drive system component actuating the control signal and modifying a setting associated with the drive system component.

In some examples, the delay time associated with drive system components can include a maximum delay time associated with the drive system components. In such examples, the delay time can include a delay associated with a drive system component that has associated therewith a longest delay. In some examples, the delay time can include a minimum delay time associated with the drive system components. In such examples, the delay time can include a delay associated with a drive system component that has associated therewith a shortest delay. In some examples, the delay time can include an average delay time associated with the drive system components. In some examples, the delay time can include an average delay of two or more drive system components associated with vehicle trajectory-based control signals. In some examples, the delay time can include an average of the maximum delay time and minimum delay time. For example, a delay associated with a motor causing a vehicle to accelerate may include a delay time of 50 milliseconds and a delay associated with a braking component may include a delay time of 20 milliseconds. The delay time associated with the drive system components may be 35 milliseconds. Though this is merely an example and other times and component delays are contemplated herein.

In some examples, the time interval may alternatively, or additionally, be determined based on a delay associated with a vehicle trajectory calculation, or in other words a software delay corresponding to an amount of time required to compute a new vehicle trajectory. For example, a delay associated with a vehicle trajectory calculation may be 100 milliseconds, 150 milliseconds, 200 milliseconds etc. In at least one example, the time interval can include both a delay associated with a vehicle trajectory calculation and a delay associated with the drive system component actuation.

In some examples, the time interval may be dynamically determined. For instance, the time interval may be calculated or determined based on an amount of time between a start of calculating a previous trajectory and point at which the vehicle began to move according to the previous trajectory.

In some examples, the time interval may be based on historical data. For example, the time interval may be based on a mean, median or some other average function of a certain number of time intervals representing amounts of time between a start of calculating a previous trajectory and point at which the vehicle began to move according to the previous trajectory.

The time interval for the safety system 120 may be shorter than the time interval for the planner component 118. For example, determination of a stopping trajectory by the safety system 120 may require less calculation time than for a trajectory determined by the planner component 118. This is because the stopping trajectory is essentially predetermined as a trajectory that safely brings the vehicle 102 to a stop and therefore requires less computational power to generate. Furthermore, the safety system 120 can be constantly determining stopping trajectories such that if a safety event is detected, then a stopping trajectory can be immediately implemented. In such examples, the time interval for the safety system 120 may be mostly comprised of delays associated with modification to a drive system component. The delay time may account for a delay in actuating the braking component to cause the vehicle 102 to slow as necessary according to the stopping trajectory.

Continuing the example from above, at a first time $T_1$, the vehicle computing system 116 may detect the presence of the object 104 within the planned path 108 of the vehicle 102 via the one or more sensors. The safety system 120 may determine, or have predetermined, a stopping trajectory 126 to operate the vehicle 102 at a second time $T_2$ that, when implemented, would cause the vehicle 102 to avoid a collision with the object 104. As discussed above, a time interval $\Delta T_1$ corresponding to the difference between the second time $T_2$ and the first time $T_1$ may comprise at least a delay associated with modification to a drive system component.

The vehicle computing system 116 may determine that a likelihood of a collision with the object 104 meets or exceeds a threshold probability if the vehicle 102 were to continue moving according to the initial vehicle trajectory 120. The determination may be performed by the safety system 120. Based on determining that the likelihood of collision meets or exceeds the threshold probability, the vehicle 102 may be controlled according to the determined stopping trajectory 126 at the second time $T_2$. That is, the stopping trajectory 126 determined by the safety system 120 may be provided to the tracker component 122 to control the vehicle 102. The tracker component 122 may send one or more control signals to a braking system component to cause the vehicle 102 to decelerate.

After the second time $T_2$, the vehicle 102 begins to decelerate according to the stopping trajectory 126. The planner component 118 may determine or calculate trajectories that would bring the vehicle 102 out of the stopping trajectory 126 and continue the vehicle 102 on the planned path 108. Such trajectories calculated by the planner component 118 may be referred to as "recovery trajectories" because they are configured to recover the vehicle 120 from the stopping trajectory 126. The planner component 118 may receive the current stopping trajectory 126 from the safety system 120. With this, the planner component 118 may be able to determine and/or use at least one parameter associated with the stopping trajectory 126 to compute a recovery trajectory. This may allow at least one parameter associated with the recovery trajectory to be determined in such a way that it is continuous with a corresponding parameter associated with the stopping trajectory 126. In addition to receiving the stopping trajectory 126, at least one parameter of the state of the vehicle 102 may be determined. The parameters may include a longitudinal vehicle position, latitudinal vehicle position, 2-dimensional vehicle position, 3-dimensional vehicle position, velocity, speed, heading, acceleration, an orientation, higher order derivatives of position etc. In an example, the current spatial position of the vehicle 102 may be determined. The current spatial position may be the spatial position of the vehicle at a third time $T_3$ after the second time $T_2$ and may include longitudinal and/or latitudinal components. The current spatial position may be determined by one or more further sensors associated with the vehicle, and may be determined in one, two or three dimensions. While spatial position will be discussed with regards to the example scenario illustrated in FIG. 1, it is understood that this description extends to other parameters of the state of the vehicle 102. For instance, a current heading of the vehicle 102 may be determined at the third time $T_3$ as well or instead.

The determined current state may then be projected onto the stopping trajectory at the third time $T_3$. In an example, when the determined current state is a spatial position (longitudinal and/or latitudinal), projecting may involve mapping the determined current position onto the stopping trajectory at the third time $T_3$. Based on this projection, an estimated state of the vehicle at a fourth time $T_4$, after the third time $T_3$, can be determined, estimated, or calculated. A second time interval $\Delta T_3$ between the fourth time $T_4$ and the third time $T_3$ may correspond to, or include, any or a combination of the delays and time intervals described above. Projecting a determined current state onto the stopping trajectory ensures that the tracker component 122 is provided with a continuous series of trajectories reducing sporadic and irregular changes in direction and/or velocity. The tracker component 122 itself may then correct for any differences between the actual vehicle state and the determined trajectories.

Based on the estimated state of the vehicle at the fourth time $T_4$ and the stopping trajectory 126 at the fourth time $T_4$, a recovery trajectory 128 can then be determined. The recovery trajectory 128 may be designed to be continuous with the stopping trajectory 126 at the fourth time $T_4$. Continuity may mean that the recovery trajectory 128 and the stopping trajectory 128 intersect at the fourth time $T_4$ and at least their first derivatives (e.g. the acceleration associated with each trajectory) are substantially the same at the fourth time $T_4$. In further examples, higher derivatives of position of the recovery trajectory 128 and the stopping trajectory 126 may be the same at the fourth time $T_4$. The recovery trajectory 128 may be configured to return the vehicle 102 to nominal driving and to prevent the vehicle 102 from coming to a stop according to the stopping trajectory 126. Nominal driving may refer to a standard or expected behavior of a vehicle under typical operating conditions and may represent a predetermined modality in which the vehicle should navigate and interact with its environment when functioning as intended under such typical operating conditions. Nominal driving may therefore involve following traffic rules, maintaining safe speeds, properly reacting to traffic signals, handling lane changes, and smoothly navigating through various scenarios encountered on the road.

In some examples, the recovery trajectory 128 maintains the vehicle 102 in motion and continues the vehicle 102 towards a destination. In other examples, the recovery trajectory 128 may bring the vehicle to a more controlled, less forceful stop. In any case, the recovery trajectory 128 returns the vehicle 102 to a regular, non-critical driving scenario. In some examples, nominal trajectories associated with the scenario prior to the detection of the object 104 may continue to be determined by the planner component 118 while recovery trajectories are being determined. In this way, the planner component 118 may calculate the recovery trajectory 128 to maneuver the vehicle 102 towards the trajectory of the vehicle 102 prior to detection of the object 104.

All the while, the vehicle computing system 116 may be continually, regularly or irregularly detecting the presence of the object 104 in the planned path 108. The vehicle computing system 116 may then continue to determine whether the likelihood of a collision with the object 104 (or other metric for stopping, such as a detected fault) meets or exceeds the threshold probability based on at least the current trajectory 126 of the vehicle 102 or the calculated recovery trajectory 128. If the vehicle computing system 116 determines that the likelihood of a collision with the object 104 is less than the threshold probability at the fourth time $T_4$ if the vehicle were to operate according to the recovery trajectory 128, then the recovery trajectory 128 can be provided to the tracker component 122 as well as, in some instances, an indication to switch from the stopping trajectory (though the additional recovery trajectory provided may, in some examples, comprise such an indication). This may be the case if the object 104 has moved off the planned path 108 according to a trajectory indicated by the dashed arrow 130 at some time after the second time $T_2$, and so no longer poses a collision threat. Alternatively, or additionally, determining that the likelihood of a collision with the object 104 is less than the threshold probability may involve determining that the object 104 never posed a collision threat. For example, as the vehicle 102 moves closer to the object 104, it may be able to better detect the object 104 and determine that it is not actually on the planned path 108.

As discussed above, other examples of safety events that may have triggered the implementation of a stopping trajectory include faults associated with the vehicle 102, another vehicle, or some other component associated with transport safety. In these examples, determining that the safety event has been removed or resolved may involve determining that a likelihood of a problem being caused by the fault is less than a threshold probability. Other examples are envisaged.

The vehicle 102 can then be controlled based at least in part on the recovery trajectory 128 at the fourth time T$_4$. In this way, the vehicle 102 can be controlled to move according to a recovery trajectory 128 before coming to a stop in accordance with the stopping trajectory 126. The tracker component 122 is only aware of a single, continuous, trajectory that is implemented, resulting in a reduction in irregular or sporadic changes in speed of the vehicle 102 and further allows the vehicle to stay in motion.

The planner component 118 may continually update the recovery trajectory 128 based on a desired destination, the environment around the vehicle amongst other factors. The planner component 118 may update the recovery trajectory 128 according to techniques such as those described in U.S. patent application Ser. No. 17/327,350, filed May 21, 2021 and entitled "Vehicle Trajectory Determination," the entire contents of which are incorporated herein by reference for all purposes. On the other hand, the stopping trajectory 126 is not updated.

Figure 2:
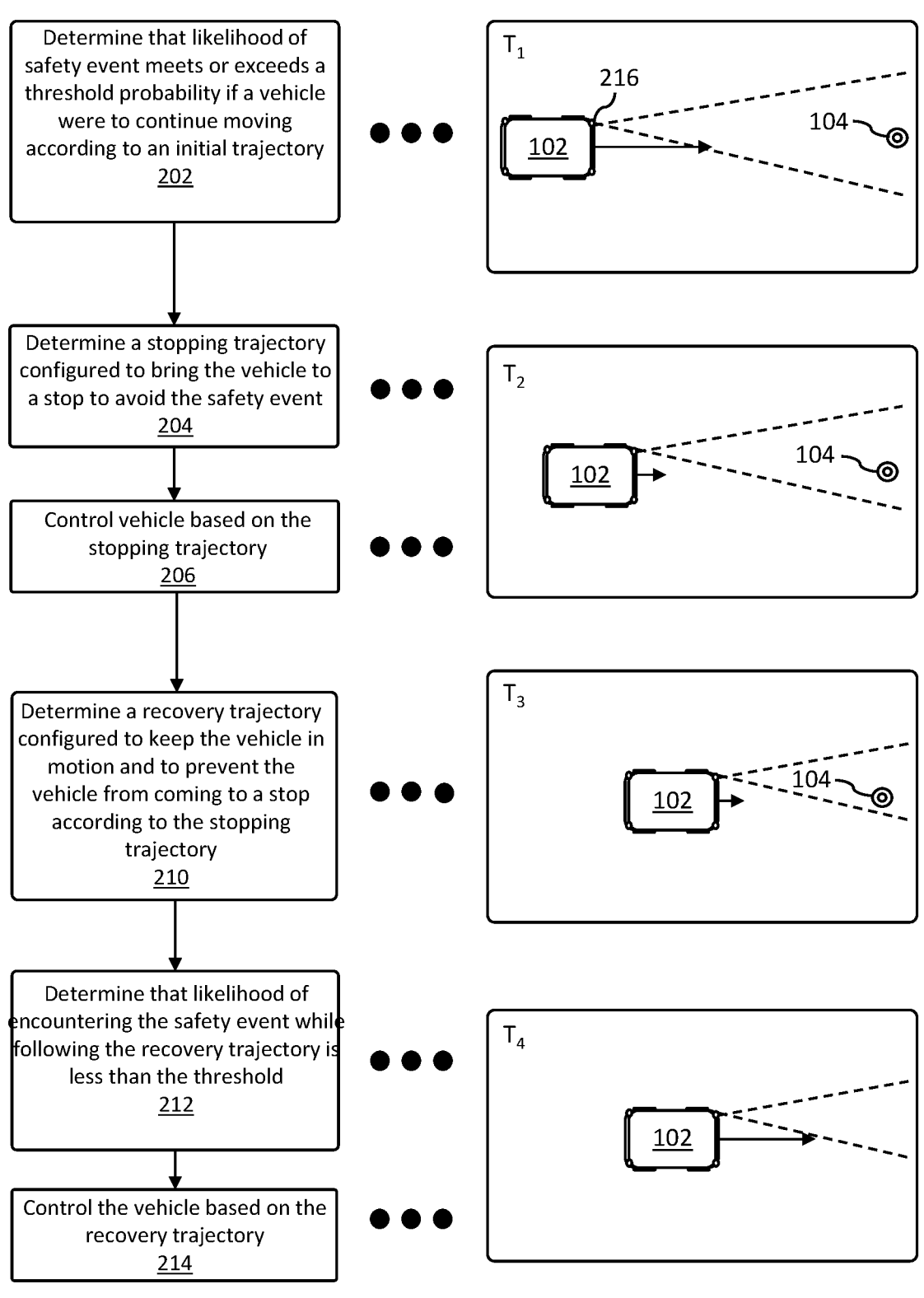
FIG. 2 illustrates a process for determining a vehicle trajectory, in accordance with examples of this disclosure.

FIG. 2 depicts an example process 200 for determining a trajectory for a vehicle 102. The process 200 may be applied to the scenario illustrated in FIG. 1. At operation 202, a vehicle computing system, such as vehicle computing system 116, determines that a likelihood of a safety event meets or exceeds a threshold probability if the vehicle 102 were to continue moving according to an initial trajectory. An example of the safety event is the presence of the object 104 in the planned path 108 of the vehicle 102. Other examples have been described above, but in general a safety event may be any event that may prejudice the safety of the vehicle 102, its occupant(s) or other objects external from the vehicle 102. The initial trajectory may be a trajectory determined by a planner component, such as the planner component 118. The initial trajectory may be configured in accordance with a planned path of the vehicle 102 through the environment towards a destination.

Determining that the likelihood of a safety event meets or exceeds a threshold probability may comprise detecting the safety event, such as from sensor data acquired from one or more sensors associated with the vehicle 102, additional data including faults from one or more components of the vehicle, etc. In the example illustrated in FIG. 2, a lidar sensor 216 on the vehicle 102 detects an object 104. A field of view of the lidar sensor 216 is indicated by the dashed lines. One or more computing devices, on board or remote from the vehicle 102, may analyse the sensor data to interpret the sensor data and to provide an estimate of the likelihood of the safety event occurring. This likelihood may be compared to a predetermined threshold probability, which may be a probability at which the safety event is 50%, 60%, 70% etc. likely to occur. Furthermore, the likelihood of the safety event meeting or exceeding the threshold probability may be determined at a first time T$_1$. In other examples, the likelihood may be a binary variable, for example where 1 indicates that the safety event is likely to occur, and 0 indicates that it is unlikely to occur.

At operation 204, a stopping trajectory is determined that is configured to bring the vehicle 102 to a stop to avoid the safety event. The stopping trajectory may be associated with the vehicle at a second time T$_2$ after the first time T$_1$. A time interval between first time T$_1$ and the second time T$_2$ may be based on a delay time associated with initiating a modification to a drive system component, such as a delay in actuating a braking component. As described above, stopping trajectories may be continuously, regularly or non-regularly determined by a safety system, such as the safety system 120 so that, in the event of a determination of a safety event occurring, a stopping trajectory can be immediately implemented, ensuring it is more likely that the safety event is avoided.

At operation 206, the vehicle 102 is controlled based on the stopping trajectory at the second time T$_2$. Controlling the vehicle 102 according to the stopping trajectory may be based on the determination that the likelihood of the safety event meets or exceeds the threshold probability. As described above, the stopping trajectory is designed to bring the vehicle 102 to a stop and so the vehicle begins to decelerate at the second time T$_2$. The lidar sensor 216 may continue to detect the presence of the object 104 in the planned path of the vehicle 102 at this time.

At operation 210, a recovery trajectory is determined that is configured to keep the vehicle in motion and to prevent the vehicle from coming to a stop according to the stopping trajectory. The recovery trajectory may be determined by the planner component and may be designed to continue the vehicle 102 to a pre-planned destination. The recovery trajectory may be determined at a third time T$_3$ after the second time T$_2$, and may be configured to operate the vehicle 102 at a time in the future, for example at a fourth time T$_4$ after the third time T$_3$. The time interval into to the future by which the recovery trajectory would operate the vehicle 102 may be based on a delay time associated with initiating a modification to a drive system component and/or a delay associated with a vehicle trajectory calculation, as described above.

In some examples, the planner component may be configured to determine recovery trajectories at a regular rate. Each recovery trajectory can be provided to the safety system which can analyze the recovery trajectory and determine whether it is safe to implement. For instance, it may be determined that likelihood of encountering the safety event while following a particular recovery trajectory still meets or exceeds the threshold probability, meaning that the safety event is still likely to occur if the vehicle were to begin moving according to the particular recovery trajectory. In this case, safety system may disregard the particular recovery trajectory and continue implementing the stopping trajectory (e.g. providing the stopping trajectory to the tracker component). The safety system may perform one or more validity checks on the received recovery trajectory. The validity checks may include determining that the recovery trajectory is safe to implement, that the recovery trajectory is continuous with the stopping trajectory, that steering angles/rates match, and so on.

At operation 212, a likelihood of encountering the safety event while following the recovery trajectory configured to operate the vehicle at the fourth time T$_4$ is determined to be less than the threshold. In the example illustrated in FIG. 2, the object 104 has been removed from the path of the vehicle 102. The lidar sensor 216 may have captured data at the fourth time T$_4$ indicating that the object 104 is no longer in the vehicle's path. One or more computing devices may analyse the sensor data and determine that there is now a likelihood of encountering the safety event that is less than the threshold. This determination may be provided to the safety system (or the safety system may perform the determination itself), and the safety system may determine that the previously provided recovery trajectory is now safe to implement. Trajectory determination for the vehicle may then be handed off to the planner component again, and the recovery trajectory can be provided to the tracker component. Therefore, at operation 214, the vehicle 102 is controlled based on the recovery trajectory.

Figure 3A:
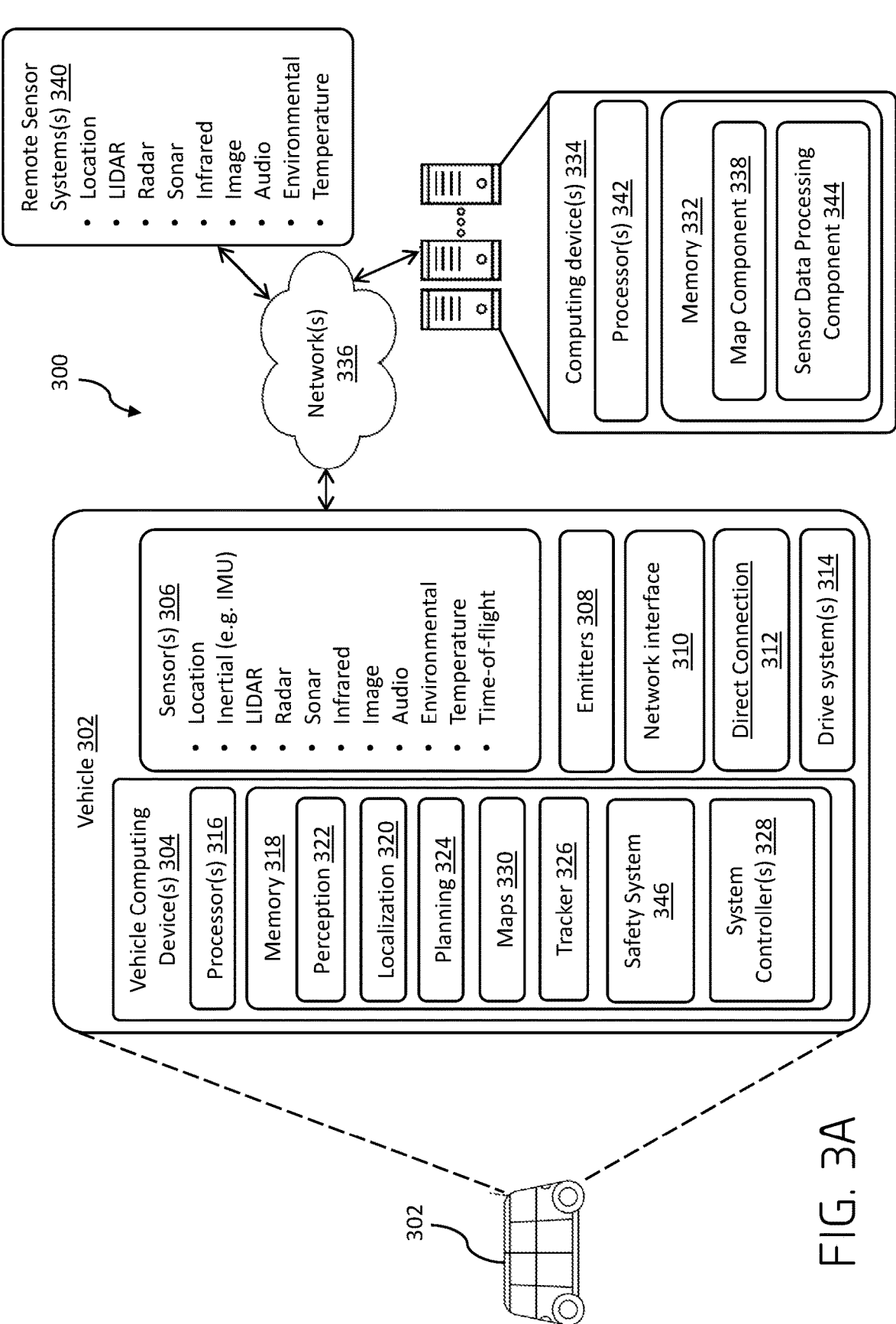
FIG. 3A is a block diagram of an example system for implementing the techniques described herein.

FIG. 3A is a block diagram of an example system 300 for implementing the techniques described herein. In at least one example, the system 300 may include a vehicle 302, such as vehicle 102.

The vehicle 302 may include one or more vehicle computing devices 304, such as the vehicle computing systems described herein, one or more sensor systems 306, one or more emitters 308, one or more communication connections 310, at least one direct connection 312, and one or more drive systems 314.

The vehicle computing device 304 may include one or more processors 316 and memory 318 communicatively coupled with the one or more processors 316. In the illustrated example, the vehicle 302 is an autonomous vehicle; however, the vehicle 302 could be any other type of vehicle, such as a semi-autonomous vehicle, or any other system having at least an image capture device (e.g., a camera enabled smartphone). In the illustrated example, the memory 318 of the vehicle computing device 304 stores a localization component 320, a perception component 322, a planner component 324, a tracker component 326, a safety system 346, one or more system controllers 328, and one or more maps 330. Though depicted in FIG. 3A as residing in the memory 318 for illustrative purposes, it is contemplated that a localization component 320, a perception component 322, a planner component 324, a tracker component 326, a safety system 346, one or more system controllers 328, and one or more maps 330, may additionally, or alternatively, be accessible to the vehicle 302 (e.g., stored on, or otherwise accessible by, memory remote from the vehicle 302, such as, for example, on memory 332 of a remote computing device 334).

In at least one example, the localization component 320 may include functionality to receive data from the sensor system(s) 306 to determine a position and/or orientation of the vehicle 302 (e.g., one or more of an x-, y-, z-position, roll, pitch, or yaw). For example, the localization component 320 may include and/or request/receive a map of an environment and may continuously determine a location and/or orientation of the autonomous vehicle within the map. In some instances, the localization component 320 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 320 may provide data to various components of the vehicle 302 to determine an initial position of an autonomous vehicle for generating a path polygon (e.g., vehicle corridor) associated with the vehicle path, as discussed herein.

In some instances, the perception component 322 may include functionality to perform object detection, segmentation, and/or classification. In some examples, the perception component 322 may provide processed sensor data that indicates a presence of an object (e.g., entity) that is proximate to the vehicle 302 and/or a classification of the object as an object type (e.g., car, pedestrian, cyclist, animal, building, tree, road surface, curb, sidewalk, unknown, etc.). In some examples, the perception component 322 may provide processed sensor data that indicates a presence of a stationary entity that is proximate to the vehicle 302 and/or a classification of the stationary entity as a type (e.g., building, tree, road surface, curb, sidewalk, unknown, etc.). In additional or alternative examples, the perception component 322 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object (e.g., object speed), an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planner component 324 may determine a path for the vehicle 302 to follow to traverse through an environment. For example, the planner component 324 may determine various routes and trajectories and various levels of detail. For example, the planner component 324 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 324 may generate an instruction for guiding the autonomous vehicle 302 along at least a portion of the route from the first location to the second location. In at least one example, the planner component 324 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In some examples, the planner component 324 may include a prediction component to generate predicted trajectories associated with objects operating in an environment. For example, a prediction component may generate one or more predicted trajectories for objects within a threshold distance from the vehicle 302. In some examples, a prediction component may measure a trace of an object and generate a trajectory for the object based on observed and predicted behavior. In various examples, the planner component 324 may be configured to determine an action for the vehicle to take based at least in part on the predicted trajectories of objects in the environment. In such examples, the planner component 324 may select a vehicle trajectory for the vehicle to travel based at least in part on the action (e.g., based in part on the detected object and/or a predicted object trajectory associated therewith).

In various examples, the planner component 324 may provide a selected vehicle trajectory to the tracker component 326. In various examples, the tracker component 326 may additionally receive position and/or orientation data, such as that determined by the localization component 320. The tracker component 326, such as tracker component 122, may be configured to determine a position and/or orientation of the vehicle with respect to a planned trajectory, such as based on steering angles, velocities, accelerations, drive direction, drive gear, and/or gravity acceleration. The tracker component 326 may be configured to determine control signals to cause the vehicle to adjust one or more drive components, such as to track a determined trajectory. The tracker component 326 may determine the adjustments based on the current position and/or orientation data, such as to cause the vehicle to accurately track or steer back to a vehicle trajectory.

The safety system 346 may take the form of a collision avoidance system, also referred to as a pre-crash system, a forward collision warning system (FCW), or a collision mitigation system. In general, the safety system 346 may determine a likelihood that a safety event will occur. In some examples, the safety system may receive sensor data generated by the sensor system(s) 306 and/or the remote sensor system(s) 340. The safety system may additionally, or alternatively, receive other data indicative of one or more faults associated with the vehicle 302, one or more faults associated with another vehicle, or one or more faults associated with a remote system that may have an impact on the safety of the vehicle 302. The safety system 346 may analyze and interpret the data to determine a likelihood that a safety event will occur, and may use any suitable algorithm or procedure to do so.

The safety system 346 may also be responsible for determining a path or trajectory for the vehicle 302 to follow in accordance with a safety event (detected or not) and provide the path or trajectory to the tracker component 326. For example, the safety system 346 may determine trajectories that are designed to traverse, address and/or avoid a safety event.

In at least one example, the vehicle computing device 304 may include one or more system controllers 328, which may be configured to control steering, propulsion, braking, safety, emitters, communication, and other systems of the vehicle 302. The system controller(s) 328 may communicate with and/or control corresponding systems of the drive system(s) 314 and/or other components of the vehicle 302.

The memory 318 may further include one or more maps 330 that may be used by the vehicle 302 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 302 may be controlled based at least in part on the map(s) 330. That is, the map(s) 330 may be used in connection with the localization component 320, the perception component 322, and/or the planner component 324 to determine a location of the vehicle 302, detect objects in an environment, and/or generate routes and/or trajectories to navigate within an environment.

In various examples, the map(s) 330 may be utilized by the vehicle computing device 304 to determine a right of way, such as at an intersection. The right of way may indicate an entity (e.g., the vehicle 302 or an object) that has priority at the intersection or other junction. In various examples, the map(s) 330 may indicate the right of way based on a vehicle location, direction of travel, object location, object direction of travel, object predicted trajectory, or the like.

In some examples, the one or more maps 330 may be stored on a remote computing device(s) (such as the computing device(s) 334) accessible via network(s) 336, such as in map component 338. In some examples, multiple maps 330 may be stored based on, for example, a characteristic (e.g., type of entity, time of day, day of week, season of the year, etc.). Storing multiple maps 330 may have similar memory requirements, but increase the speed at which data in a map may be accessed.

As can be understood, the components discussed herein (e.g., the localization component 320, the perception component 322, the planner component 324, the tracker component 326, the one or more system controllers 328, and the one or more maps 330 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 318 (and the memory 332, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet30, ResNet101, VGG, DenseNet, PointNet, and the like.

In at least one example, the sensor system(s) 306 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 may include multiple instances of each of these or other types of sensors. For instance, the lidar sensors may include individual lidar sensors located at the corners, front, back, sides, and/or top of the vehicle 302. As another example, the camera sensors may include multiple cameras disposed at various locations about the exterior and/or interior of the vehicle 302. The sensor system(s) 306 may provide input to the vehicle computing device 304. Additionally or in the alternative, the sensor system(s) 306 may send sensor data, via the one or more networks 336, to the one or more computing device(s) 334 at a particular frequency, after a lapse of a predetermined period of time, in near real-time, etc.

The vehicle 302 may also include one or more emitters 308 for emitting light and/or sound. The emitters 308 in this example include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 may also include one or more communication connection(s) 310 that enable communication between the vehicle 302 and one or more other local or remote computing device(s). For instance, the communication connection(s) 310 may facilitate communication with other local computing device(s) on the vehicle 302 and/or the drive system(s) 314. Also, the communication connection(s) 310 may allow the vehicle to communicate with other nearby computing device(s) (e.g., computing device(s) 334, other nearby vehicles, etc.) and/or one or more remote sensor system(s) 340 for receiving sensor data.

The communications connection(s) 310 may include physical and/or logical interfaces for connecting the vehicle computing device 304 to another computing device or a network, such as network(s) 336. For example, the communications connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 3G, etc.) or any suitable wired or wireless communications protocol that enables the respective computing device to interface with the other computing device(s).

In at least one example, the vehicle 302 may include one or more drive systems 314. In some examples, the vehicle 302 may have a single drive system 314. In at least one example, if the vehicle 302 has multiple drive systems 314, individual drive systems 314 may be positioned on opposite ends of the vehicle 302 (e.g., the front and the rear, etc.). In at least one example, the drive system(s) 314 may include one or more sensor systems to detect conditions of the drive system(s) 314 and/or the surroundings of the vehicle 302. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 314. In some cases, the sensor system(s) on the drive system(s) 314 may overlap or supplement corresponding systems of the vehicle 302 (e.g., sensor system(s) 306).

The drive system(s) 314 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). The non-limiting examples of the vehicle systems listed above may additionally or alternatively be referred to herein as "components" of the drive system(s) 314. In various examples, each of the components of the drive system(s) 314 may include a latency associated with processing control signals. In various examples, the vehicle computing device(s) 304 may be configured to determine updated vehicle trajectories and/or send control signals based on one or more component latencies. For example, the planner component 324 may be configured to determine updated trajectories at a time interval based in part on a component latency. For another example, the tracker component 326 may be configured to send signals to a drive system component based in part on an associated latency.

Additionally, the drive system(s) 314 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 314. Furthermore, the drive system(s) 314 may also include one or more communication connection(s) that enable communication by the respective drive module with one or more other local or remote computing device(s).

In at least one example, the direct connection 312 may provide a physical interface to couple the one or more drive system(s) 314 with the body of the vehicle 302. For example, the direct connection 312 may allow the transfer of energy, fluids, air, data, etc. between the drive system(s) 314 and the vehicle. In some instances, the direct connection 312 may further releasably secure the drive system(s) 314 to the body of the vehicle 302.

In at least one example, the localization component 320, the perception component 322, the planner component 324, the tracker component 326, the one or more system controllers 328, the safety system 344, and the one or more maps 330 and various components thereof, may process sensor data, as described above, and may send their respective outputs, over the one or more network(s) 336, to the computing device(s) 334. In at least one example, the localization component 320, the perception component 322, the planner component 324, the tracker component 326, the one or more system controllers 328, and the one or more maps 330 may send their respective outputs to the computing device(s) 334 at a particular frequency, after a lapse of a predetermined period of time, in near real-time, etc.

In some examples, the vehicle 302 may send sensor data to the computing device(s) 334 via the network(s) 336. In some examples, the vehicle 302 may receive sensor data from the computing device(s) 334 via the network(s) 336. The sensor data may include raw sensor data and/or processed sensor data and/or representations of sensor data. In some examples, the sensor data (raw or processed) may be sent and/or received as one or more log files.

The computing device(s) 334 may include processor(s) 342 and a memory 332 storing the map component 338 and a sensor data processing component 344. In some examples, the map component 338 may include functionality to generate maps of various resolutions. In such examples, the map component 338 may send one or more maps to the vehicle computing device 304 for navigational purposes. In various examples, the sensor data processing component 344 may be configured to receive data from one or more remote sensors, such as sensor systems 306 and/or remote sensor system(s) 340. In some examples, the sensor data processing component 344 may be configured to process the data and send processed data to the vehicle computing device(s) 304. In some examples, the sensor data processing component 344 may be configured to send raw sensor data to the vehicle computing device(s) 304.

The processor(s) 316 of the vehicle 302 and the processor(s) 342 of the computing device(s) 334 may be any suitable processor capable of executing instructions to process data and perform operations as described herein. By way of example and not limitation, the processor(s) 316 and 342 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 318 and 332 are examples of non-transitory computer-readable media. The memory 318 and 332 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 318 and 332 may include at least a working memory and a storage memory. For example, the working memory may be a high-speed memory of limited capacity (e.g., cache memory) that is used for storing data to be operated on by the processor(s) 316 and 342. In some instances, the memory 318 and 332 may include a storage memory that may be a lower-speed memory of relatively large capacity that is used for long-term storage of data. In some cases, the processor(s) 316 and 342 cannot operate directly on data that is stored in the storage memory, and data may need to be loaded into a working memory for performing operations based on the data, as discussed herein.

It should be noted that while FIG. 3A is illustrated as a distributed system, in alternative examples, components of the vehicle 302 may be associated with the computing device(s) 334 and/or components of the computing device(s) 334 may be associated with the vehicle 302. That is, the vehicle 302 may perform one or more of the functions associated with the computing device(s) 334, and vice versa.

Figure 3B:
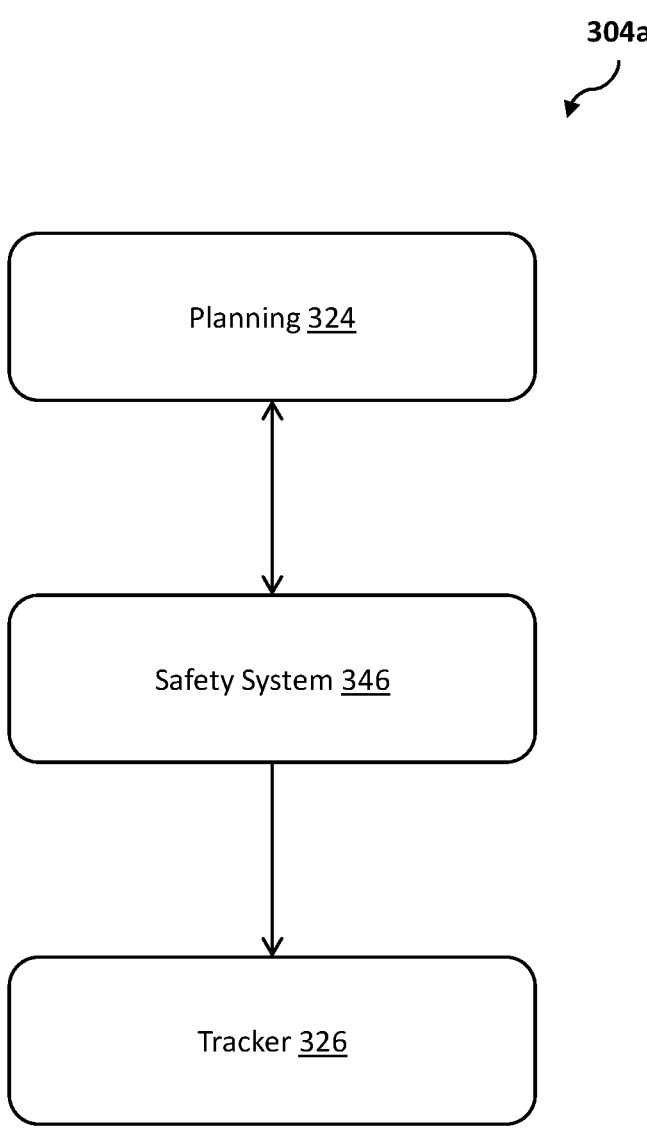
FIG. 3B is a block diagram of an example control system for generating and implementing trajectories in accordance with examples described herein.

FIG. 3B is a block diagram illustrating a vehicle computing system 360 according to some examples. The vehicle computing system 304a may be a subsystem of a larger system, such as part of the vehicle computing device(s) 304 depicted in FIG. 3A. The vehicle computing system 304a may therefore be located on a vehicle, such as the vehicle 302 illustrated in FIG. 3A. The vehicle computing system 304a may alternatively be located remotely from a vehicle in which it is controlling or may be dispersed between the vehicle and a remote system.

The vehicle computing system 304a comprises a planning component 324, a safety system 346 and a tracker 326, which may provide similar functionality to the similarly labelled components described with reference to FIG. 3A. Each of the planning component 324, safety system 346 and tracker 326 may be different components or systems implemented across different computing devices or integrated into a single computing device.

As shown in FIG. 3B, the planning component 324 interfaces with the safety system 346. The planning component 324 can receive stopping trajectories generated by the safety system 346, for example for use in computing recovery trajectories, and can transmit generated trajectories to the safety system 346. The safety system 346 can analyze trajectories received from the planning component 324. If these trajectories are determined to be safe to implement, they can be transmitted to the tracker 326, which determines one or more control signals to send to a drive system to control the vehicle. The safety system 346 can also generate stopping trajectories in a manner described above with reference to FIG. 1 and FIG. 2. The stopping trajectories can similarly be transmitted by the safety system 346 to the tracker 326.

FIGS. 1 and 2 illustrate example scenarios wherein a vehicle is controlled to operate according to trajectories determined by a planner component and a safety system. However, the techniques described herein are more general and apply to control of a vehicle according to two or more trajectories determined by respective two or more computing systems. FIG. 4 illustrates a process in accordance with more general examples of the present disclosure. The process is illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 4 depicts an example process 400 for determining a vehicle trajectory associated with vehicle operation in an environment, such as environment 100. Some or all of the process 400 may be performed by one or more components in FIG. 3A and/or FIG. 3B, as described herein. For example, some or all of the process 400 may be performed by the vehicle computing device(s) 304. The process 400 will also be described with reference to FIGS. 5-8 which illustrate a time-sequence of a trajectory determination.

At operation 402, the process 400 comprises detecting a safety event associated with a vehicle operating in an environment while traversing a first trajectory. The safety event may be any event that is prejudicial to the safety of the vehicle, its occupant(s), people remote from the vehicle, another vehicle or associated with some other adverse safety outcome. The detection may be based on analysis of sensor data from one or more sensors associated with the vehicle. The analysis may conclude that the likelihood of the safety event occurring meets or exceeds a threshold probability. The first trajectory may have been previously determined by a first computing system, such as the planner component 324 of the vehicle 302, and implemented by a tracker component 326.

At operation 404, the process 400 comprises determining, based on the first trajectory and the safety event, a second trajectory associated with the vehicle, the second trajectory configured to bring the vehicle to a stop. The second trajectory may be designed to be continuous with the first trajectory at a later time, and to avoid the safety event. The later time may correspond to an earliest time at which the vehicle will begin to move according to the second trajectory. A time interval between the current time and the later time may include a delay associated with initiating a modification to a drive system component, such as time required to actuate a braking system for example. The second trajectory may be determined by a second computing system, different from the first computing system. In some examples, the second computing system is a safety system.

Figure 5:
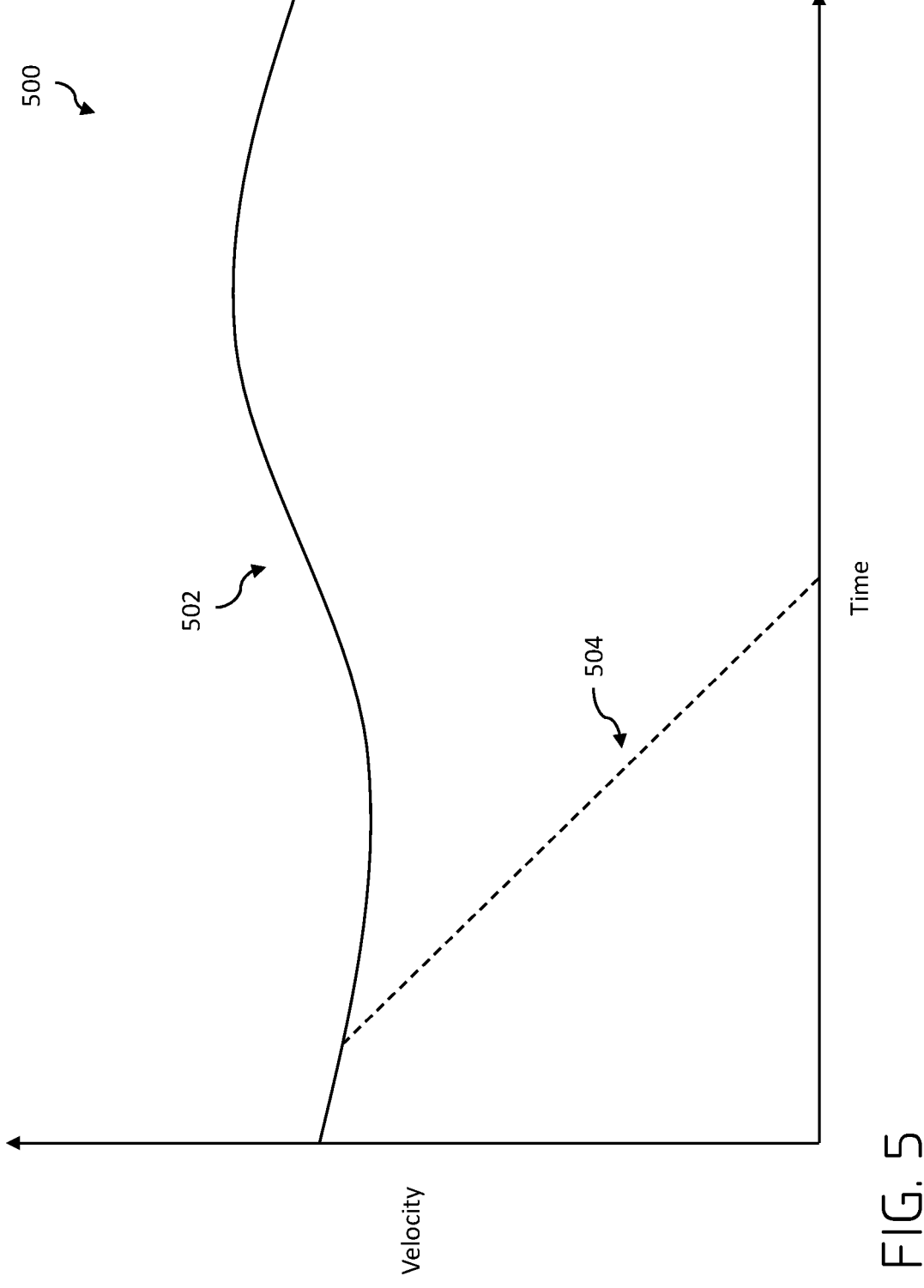
FIGS. 5 to 8 illustrate example plots associated with the example process for determining and implementing a recovery trajectory depicted in FIG. 4.

FIG. 5 shows an example plot 500 of trajectories generated by the first and second computing systems in terms of velocity as a function of time. This is merely for illustration purposes as the trajectories may describe any combination of a vehicle's state as a function of time such as a heading, orientation, position etc. In this example, the velocity is that associated with a direction of a heading of the vehicle, and is therefore a scalar quantity. For this reason, velocity and speed will be used interchangeably in this example, but it is understood that 2-dimensional or 3-dimensional velocity could be used to define the trajectories. In FIG. 5, the first trajectory 502 is indicated by a solid line, while the second trajectory 504 is indicated by the dashed line, and it can be seen that the second trajectory 504 is designed to bring the vehicle to a stop. The velocity of the second trajectory 504 matches the velocity of the first trajectory 502 at the later time.

Figure 6:
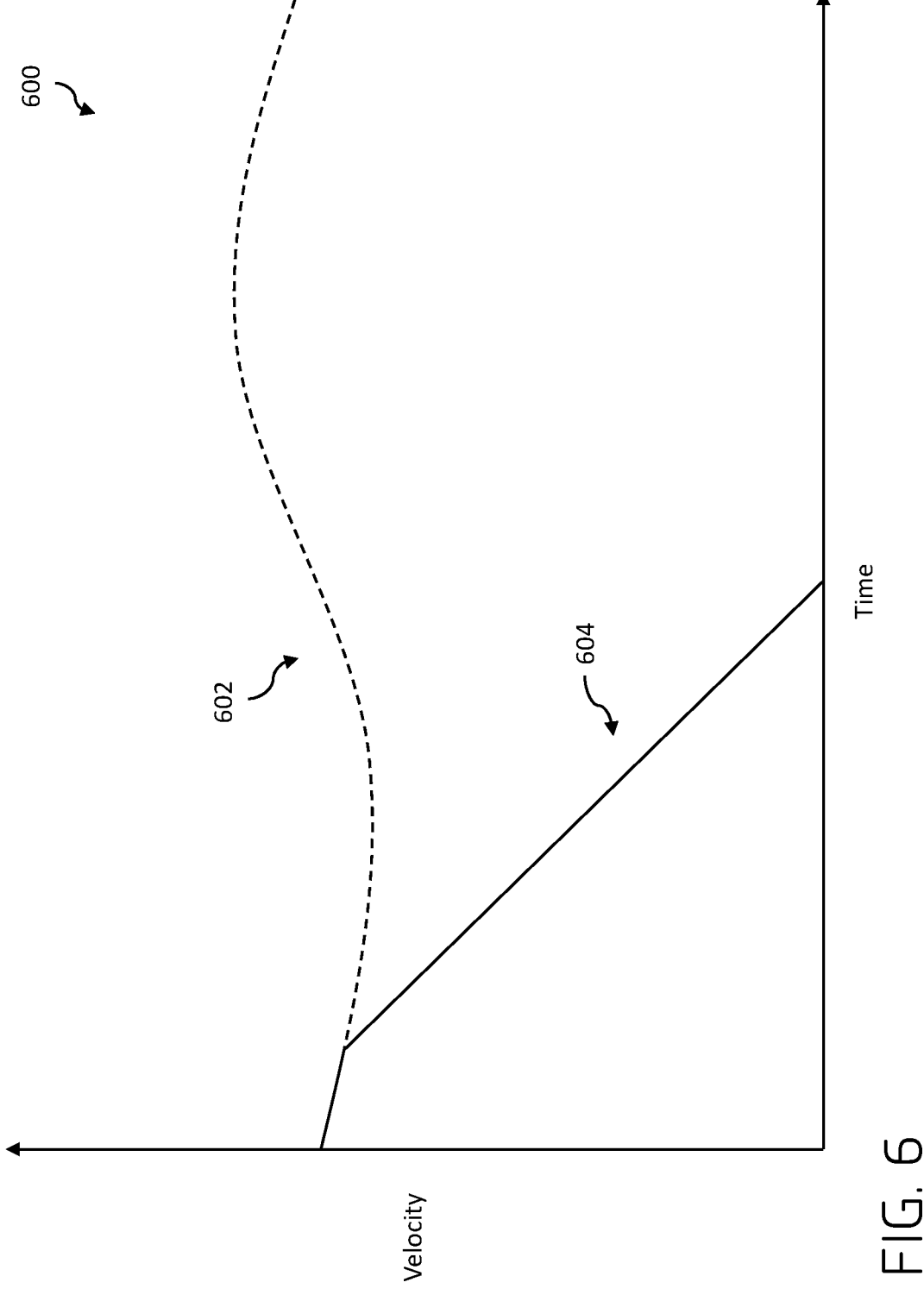

At operation 406, the process 400 comprises controlling the vehicle based on the second trajectory. Controlling the vehicle based on the second trajectory may be based on the detection of the safety event. In other words, implementation of the second trajectory causes the vehicle to enter a deceleration in accordance with the safety event. FIG. 6 is a continuation of FIG. 5 and shows a plot 600 at, or after, operation 406 has occurred. The portion of the first trajectory 602 occurring after the intersection of the second trajectory 604 is no longer being provided to the tracker component, and so is now indicated with a dashed line. Meanwhile, the second trajectory 604 is now being provided to tracker to control the vehicle, and so the second trajectory 604 is indicated by a solid line.

At operation 408, the process 400 comprises determining, based on a state associated with the second trajectory, a third trajectory associated with the vehicle, the third trajectory configured to return the vehicle to nominal driving. The third trajectory may be determined by the first computing system (i.e. the same computing system that determined the first computing system), or another computing system. The third trajectory may be determined to operate the vehicle at a later time. That time into the future by which the third trajectory would operate the vehicle may be based on a delay time associated with initiating a modification to a drive system component and/or a delay associated with a vehicle trajectory calculation, as described above.

A state of the vehicle may be determined. This may be an actual state of the vehicle, obtained by one or more sensors associated with the vehicle such as mechanical speedometers, wheel encoders, radar, lidar, GPS, or the like, as well as any combination thereof (e.g., sensor fusion). The state may be mapped, or projected, onto the second trajectory at the time that the state of the vehicle was determined, to determine a projected state. Based on the projected state, an estimated state of the vehicle at a future time can be determined. The estimated state of the vehicle may be determined via a closed-loop integration algorithm or procedure, for example.

This estimated state can be used to determine the third trajectory. In particular, the third trajectory can be determined to match the estimated state at the future time, so that if the tracker component were to receive the third trajectory at the future time, there would be little or no jerkiness in the vehicle's response. Furthermore, at least a first derivative of the third trajectory may be determined to match a first derivative of the second trajectory at the future time. This too will reduce irregular changes in the vehicle's velocity if the third trajectory were to be provided to the tracker component.

Figure 7:
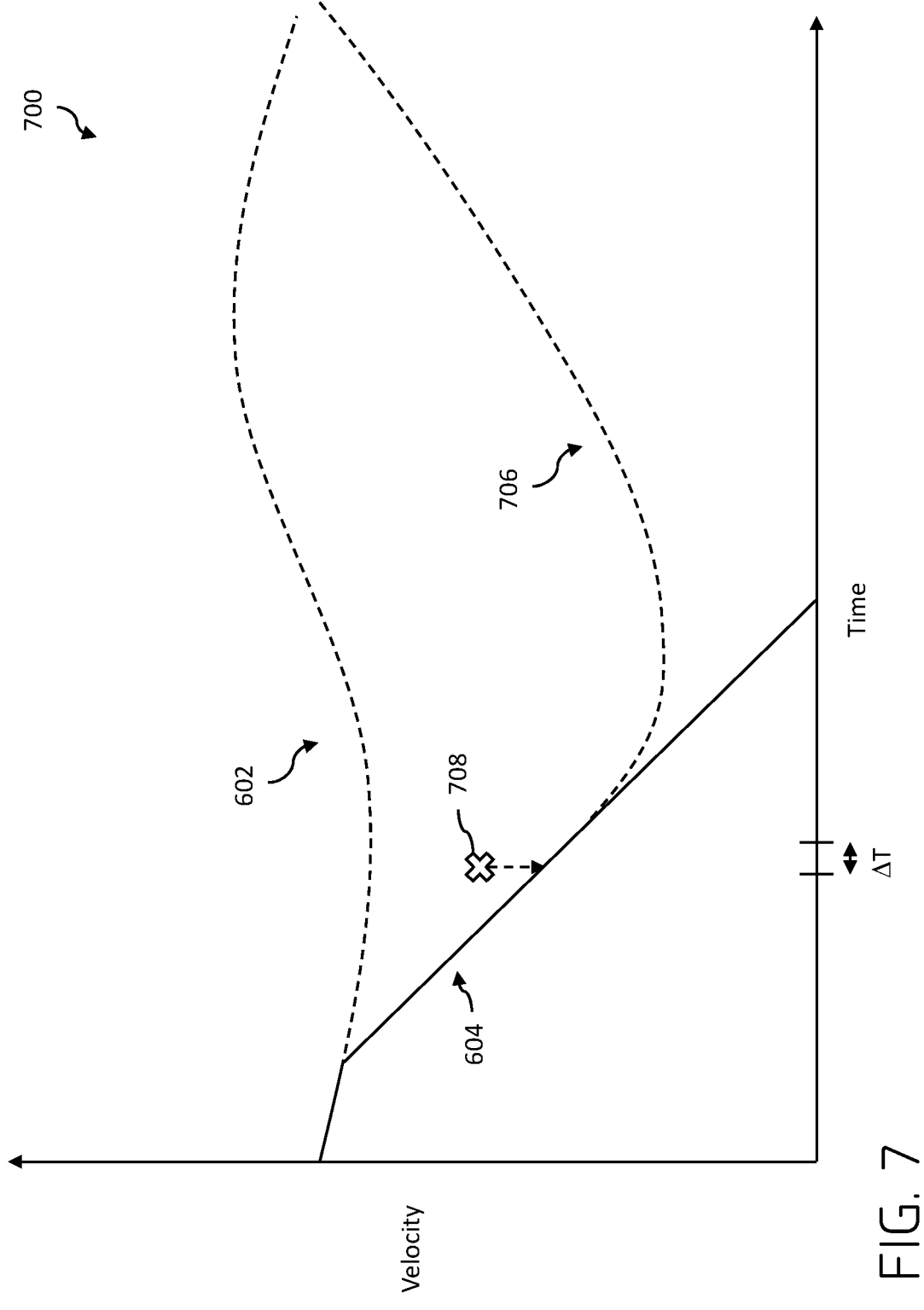

FIG. 7 is a continuation of FIG. 6 and shows a plot 700 at a point in time in which operation 408 has occurred, so that a state of the vehicle has been determined. In examples, the determined state is a longitudinal and/or latitudinal spatial position of the vehicle. The determined state is then projected onto the stopping trajectory at the time at which the state was determined. The state of the vehicle at a future time can then be determined or estimated based on the stopping trajectory. For example, a future estimated state can be obtained via a closed-loop integration algorithm or procedure, with the projected state provided as an initial state parameter.

In FIG. 7, the determined state of the vehicle is illustrated by a cross 708. Based on the discussion above, it is understood that the determined state may not be a velocity of the vehicle and so cannot be clearly depicted on a velocity-time graph (such as FIG. 7). In this case, the cross 708 should be understood as illustrating that an actual state associated with at least one parameter of the stopping trajectory is determined.

The determined state 708 may be projected onto the stopping trajectory 604 at the time that it was determined, illustrated in FIG. 7 by the dashed arrow pointing towards the stopping trajectory 604. Based on the projection and the stopping trajectory 604, an estimated state at a future time (i.e. a current time plus a time interval $\Delta T$) can be obtained. As described above, the time interval $\Delta T$ may correspond to an earliest time into the future at which the vehicle may be controlled (or controllable) according to a new trajectory. For this reason, the time interval $\Delta T$ may include delay times associated with initiating a modification to a drive system component associated with a next vehicle trajectory and/or associated with a vehicle trajectory calculation. The time interval $\Delta T$ may be dynamically determined in that it may be calculated or determined based on an amount of time between a start of calculating a previous trajectory and point at which the vehicle began to move according to the previous trajectory. In some examples, the time interval $\Delta T$ may be based on historical data.

Based on the estimated future state of the vehicle, a third trajectory 706 can be determined at the time interval $\Delta T$ into the future such that the third trajectory 706 is continuous with the second trajectory 604. The calculated third trajectory 706 is indicated with a dashed line and may be referred to as a recovery trajectory. While the third trajectory 706 illustrated in FIG. 7 causes a positive acceleration in the vehicle to bring the velocity of the vehicle back towards a pre-safety event velocity, it is understood that the third trajectory 706 could be any velocity associated with nominal driving. For instance, the third trajectory 706 may be configured to maintain the current vehicle velocity or bring the vehicle to a more gradual stop.

At operation 410, the process 400 comprises determining that the safety event no longer exists or is no longer relevant. The determination may be based on a similar analysis of sensor data from one or more sensors associated with the vehicle as discussed at operation 402. The analysis may conclude that the likelihood of the safety event occurring is now less than the threshold probability, which may indicate that it is safe to proceed along a planned path.

At operation 412, the process 400 comprises controlling the vehicle based on the third trajectory. Controlling the vehicle based on the third trajectory may be based on the determination that the safety event no longer exists or is no longer relevant. In this way, the vehicle can remain in motion while continuing on towards a destination. Furthermore, because the third trajectory may be continuous with the second trajectory, a tracker component is only aware of a single, smooth, trajectory by which to control the vehicle, resulting in a reduction in irregular or sporadic changes in velocity.

Figure 8:
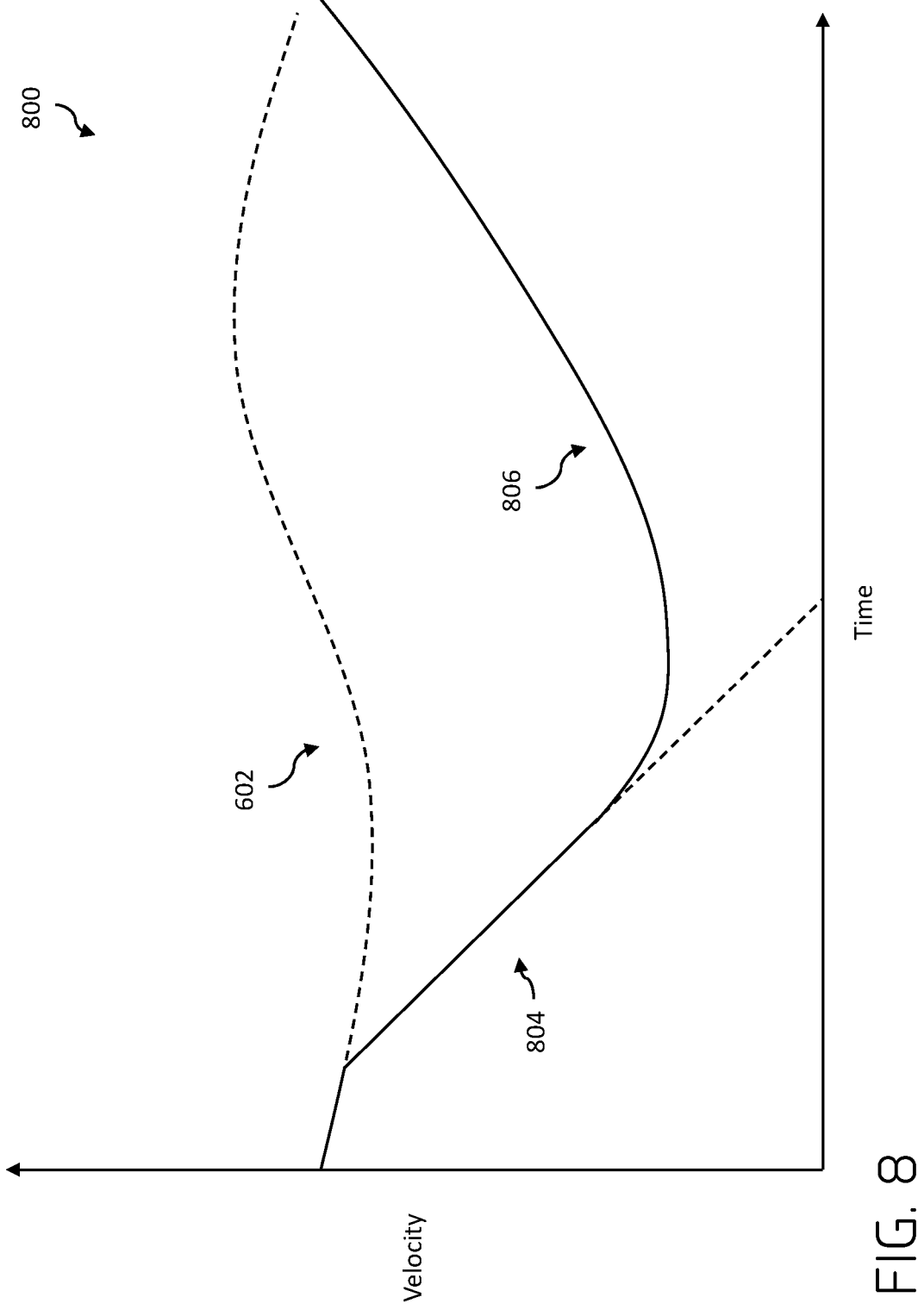

FIG. 8 is a continuation of FIG. 7 at, or after, operation 412 has occurred. The third trajectory 806 has now been implemented and is indicated with a solid line, while the portion of the second trajectory 804 that occurs after intersection with the third trajectory 806 can now be disregarded and is indicated with a dashed line. It can thus be seen that the trajectory calculated by the first and second computing systems have been stitched together to form a single continuous trajectory.

EXAMPLE CLAUSES

A: A system comprising:
one or more processors; and
one or more non-transitory computer-readable media storing instructions executable by the one or more processors, wherein the instructions, when executed, cause the system to perform operations comprising:
determining an initial vehicle trajectory;
determining, based at least in part on the initial vehicle trajectory, that a likelihood of a safety event meets or exceeds a threshold probability if a vehicle were to continue moving according to the initial vehicle trajectory;
determining, based at least in part on the likelihood meeting or exceeding the threshold, to bring the vehicle to a stop to avoid the safety event in accordance with a stopping trajectory;
controlling the vehicle based at least in part on the stopping trajectory;
determining a state of the vehicle;
determining, based at least in part on the stopping trajectory and a projection of the state of the vehicle onto the stopping trajectory, an estimated state of the vehicle at a future time;
determining, based on the estimated state of the vehicle at the future time and the stopping trajectory, a recovery trajectory configured to prevent the vehicle from coming to a stop according to the stopping trajectory;
determining that an additional likelihood of encountering the safety event while following the recovery trajectory is less than the threshold; and
based at least in part on the additional likelihood being less than the threshold, controlling the vehicle based on the recovery trajectory.

B. The system according to clause A, wherein the recovery trajectory is a second recovery trajectory, and wherein the instructions, when executed, cause the system to perform further operations comprising:
determining a first recovery trajectory;
determining that a third likelihood that the vehicle will encounter the safety event while following the first recovery trajectory meets or exceeds the threshold; and
continuing, based at least in part on the third likelihood meeting or exceeding the threshold, to control the vehicle in accordance with the stopping trajectory.

C. The system according to clause A or B, wherein the stopping trajectory is a second stopping trajectory, and wherein the instructions, when executed, cause the system to perform further operations comprising:
determining a first stopping trajectory; and
based on a second likelihood of the vehicle encountering the safety event while following the initial vehicle trajectory being less than the threshold, controlling the vehicle based on the initial vehicle trajectory.

D. The system according to any of clauses A to C, wherein controlling the vehicle based at least in part on the recovery trajectory comprises determining a threshold amount of time has passed since controlling the vehicle in accordance with the stopping trajectory.

E. The system according to any of clauses A to D, wherein a time interval between determining the state of the vehicle and the future time comprises a first amount of time based at least in part on hardware associated with controlling the vehicle and a second amount of time based at least in part on software associated with controlling the vehicle.

F. A method comprising:

detecting a safety event associated with a vehicle operating in an environment while traversing a first trajectory;

determining, based on the first trajectory and the safety event, a second trajectory associated with the vehicle, the second trajectory configured to bring the vehicle to a stop;

controlling the vehicle based on the second trajectory;

determining, based on a state associated with the vehicle following second trajectory, a third trajectory associated with the vehicle, the third trajectory configured to prevent the vehicle from coming to a stop according to the second trajectory;

determining that the safety event no longer exists or is no longer relevant; and controlling the vehicle based at least in part on the third trajectory.

G. The method according to clause F, wherein the third trajectory is determined to be continuous with the second trajectory.

H. The method according to clause G or F, wherein controlling the vehicle based at least in part on the third trajectory comprises determining a threshold amount of time has passed since controlling the vehicle in accordance with the second trajectory.

I. The method according to any of clauses G to H, wherein determining the third trajectory comprises projecting the state onto the stopping trajectory at a future time.

J. The method according to any of clauses G to I, wherein the future time is determined based at least in part on or more of:

a first time interval associated with calculating trajectories, or a second time interval associated with an actuation delay corresponding to a vehicle component associated with controlling the vehicle.

K. The method according to any of clauses G to J, comprising:

determining, based at least in part on the second trajectory, a fourth trajectory associated with the vehicle, the fourth trajectory configured to prevent the vehicle from coming to a stop according to the second trajectory; and determining that at least one of:

the safety event is still present, or that the fourth trajectory is not continuous with the second trajectory.

L. The method according to any of clauses G to K, wherein the first and third trajectories are generated by a first computing system and the second trajectory is generated by a second computing system.

M. The method according to any of clauses G to L, wherein detecting the safety event comprises a determination that the vehicle meets or exceeds a threshold probability of a collision with an object in the environment and wherein the second trajectory is configured to avoid the object.

N. The method according to any of clauses G to M, comprising:

determining, based on a vehicle state associated with the first trajectory, a fourth trajectory, the fourth trajectory configured to bring the vehicle to a stop; and based on an absence of a further safety event, controlling the vehicle based at least in part on the first trajectory.

O. The method according to any of clauses G to N, comprising:

determining a vehicle state associated with the second trajectory;

determining a projected speed of the vehicle by mapping the speed of the vehicle onto the second trajectory; and determining, based on the projected speed, an estimated state of the vehicle at a future time, wherein determining the third trajectory is further based on the estimated state of the vehicle at the future time.

P. One or more non-transitory computer-readable media storing instructions that, when executed, cause one or more processors to perform operations comprising:

detecting a safety event associated with a vehicle operating in an environment while traversing a first trajectory;

determining, based on the first trajectory and the safety event, a second trajectory associated with the vehicle, the second trajectory configured to bring the vehicle to a stop;

controlling the vehicle based on the second trajectory;

determining, based on a speed associated with the second trajectory, a third trajectory associated with the vehicle, the third trajectory configured to continue the vehicle to a destination;

determining that the safety event no longer exists or is no longer relevant; and controlling the vehicle based at least in part on the third trajectory.

Q. The one or more non-transitory computer-readable media according to clause P, wherein the third trajectory is determined to be continuous with the second trajectory.

R. The one or more non-transitory computer-readable media according to clauses P or Q, wherein controlling the vehicle based at least in part on the third trajectory comprises determining a threshold amount of time has passed since controlling the vehicle in accordance with the second trajectory.

S. The one or more non-transitory computer-readable media according to any of clauses P to R, wherein determining the third trajectory comprises projecting the state onto the stopping trajectory at a future time.

T. The one or more non-transitory computer-readable media according to any of clauses P to S, wherein the future time is determined based at least in part on or more of:

a first time interval associated with calculating trajectories, or a second time interval associated with an actuation delay corresponding to a vehicle component associated with controlling the vehicle.

U. The one or more non-transitory computer-readable media according to any of clauses P to T, wherein the instructions cause one or more processors to perform further operations comprising:

determining, based at least in part on the second trajectory, a fourth trajectory associated with the vehicle, the fourth trajectory configured to prevent the vehicle from coming to a stop according to the second trajectory; and determining that at least one of:

the safety event is still present, or that the fourth trajectory is not continuous with the second trajectory.

V. The one or more non-transitory computer-readable media according to any of clauses P to U, wherein the first and third trajectories are generated by a first computing system and the second trajectory is generated by a second computing system.

W. The one or more non-transitory computer-readable media according to any of clauses P to V, wherein detecting the safety event comprises a determination that the vehicle meets or exceeds a threshold probability of a collision with an object in the environment and wherein the second trajectory is configured to avoid the object.

X. The one or more non-transitory computer-readable media according to any of clauses P to W, wherein the instructions cause one or more processors to perform further operations comprising:

determining, based on a vehicle state associated with the first trajectory, a fourth trajectory, the fourth trajectory configured to bring the vehicle to a stop; and based on an absence of a further safety event, controlling the vehicle based at least in part on the first trajectory.

Y. The one or more non-transitory computer-readable media according to any of clauses P to X, wherein the instructions cause one or more processors to perform further operations comprising:

determining a vehicle state associated with the second trajectory;

determining a projected speed of the vehicle by mapping the speed of the vehicle onto the second trajectory; and determining, based on the projected speed, an estimated state of the vehicle at a future time, wherein determining the third trajectory is further based on the estimated state of the vehicle at the future time.

While the example clauses described above are described with respect to one particular implementation, it should be understood that, in the context of this document, the content of the example clauses can also be implemented via a method, device, system, computer-readable medium, and/or another implementation. Additionally, any of examples A-Y may be implemented alone or in combination with any other one or more of the examples A-Y.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:

detecting a safety event associated with a vehicle operating in an environment while traversing a first trajectory;

determining, based on the first trajectory and the safety event, a second trajectory associated with the vehicle, the second trajectory configured to bring the vehicle to a stop;

controlling the vehicle based on the second trajectory;

determining, based on a state associated with the vehicle following the second trajectory, a third trajectory associated with the vehicle, the third trajectory configured to prevent the vehicle from coming to a stop according to the second trajectory;

determining that the safety event no longer exists or is no longer relevant; and controlling the vehicle based at least in part on the third trajectory.

2. The method according to claim 1, wherein the third trajectory is determined to be continuous with the second trajectory.

3. The method according to claim 1, wherein controlling the vehicle based at least in part on the third trajectory comprises determining a threshold amount of time has passed since controlling the vehicle in accordance with the second trajectory.

4. The method according to claim 1, wherein determining the third trajectory comprises projecting the state onto the second trajectory at a future time.

5. The method according to claim 4, wherein the future time is determined based at least in part on one or more of:

a first time interval associated with calculating trajectories, or a second time interval associated with an actuation delay corresponding to a vehicle component associated with controlling the vehicle.

6. The method according to claim 1, comprising:

determining, based at least in part on the second trajectory, a fourth trajectory associated with the vehicle, the fourth trajectory configured to prevent the vehicle from coming to a stop according to the second trajectory; and determining that at least one of:

the safety event is still present, or that the fourth trajectory is not continuous with the second trajectory.

7. The method according to claim 1, wherein the first and third trajectories are generated by a first computing system and the second trajectory is generated by a second computing system.

8. The method according to claim 1, wherein detecting the safety event comprises a determination that the vehicle meets or exceeds a threshold probability of a collision with an object in the environment and wherein the second trajectory is configured to avoid the object.

9. The method according to claim 1, comprising:

determining a vehicle state associated with the second trajectory;

determining a projected speed of the vehicle by mapping the speed of the vehicle onto the second trajectory; and determining, based on the projected speed, an estimated state of the vehicle at a future time, wherein determining the third trajectory is further based on the estimated state of the vehicle at the future time.

10. One or more non-transitory computer-readable media storing instructions that, when executed, cause one or more processors to perform operations comprising:

detecting a safety event associated with a vehicle operating in an environment while traversing a first trajectory;

determining, based on the first trajectory and the safety event, a second trajectory associated with the vehicle, the second trajectory configured to bring the vehicle to a stop;

controlling the vehicle based on the second trajectory;

determining, based on a speed associated with the second trajectory, a third trajectory associated with the vehicle, the third trajectory configured to prevent the vehicle from coming to a stop according to the second trajectory;

determining that the safety event no longer exists or is no longer relevant; and controlling the vehicle based at least in part on the third trajectory.

11. The one or more non-transitory computer-readable media according to claim 10, storing instructions that, when executed, cause one or more processors to perform further operations comprising:

determining a state of the vehicle associated with the second trajectory;

determining a projected state of the vehicle by mapping the state of the vehicle onto the second trajectory; and determining, based on the projected state, an estimated state of the vehicle at a future time, wherein determining the third trajectory is further based on the estimated state of the vehicle at the future time.

12. The one or more non-transitory computer-readable media according to claim 10, wherein the third trajectory is determined to be continuous with the second trajectory.

13. The one or more non-transitory computer-readable media according to claim 10, wherein controlling the vehicle based at least in part on the third trajectory comprises determining a threshold amount of time has passed since controlling the vehicle in accordance with the second trajectory.

14. The one or more non-transitory computer-readable media according to claim 11, wherein a time interval between determining the state of the vehicle and the future time comprises a first amount of time based at least in part on hardware associated with controlling the vehicle and a second amount of time based at least in part on software associated with controlling the vehicle.

* * * * *